United States Patent [19]

Staar

[11] 3,918,095

[45] Nov. 4, 1975

[54] CASSETTE FOR A BAND-SHAPED MAGNETIC RECORDING SUPPORT

[76] Inventor: Marcel Jules Helene Staar, 479 Avenue Louise, Brussels, Belgium

[22] Filed: Nov. 6, 1972

[21] Appl. No.: 304,270

Related U.S. Application Data

[63] Continuation of Ser. No. 36,065, May 11, 1970.

[30] Foreign Application Priority Data

May 9, 1969 Belgium .................................. 73282

[52] U.S. Cl. .................................................. 360/132

[51] Int. Cl.$^2$.......................................... G11B 23/10

[58] Field of Search ............... 274/4 C, 4 A, 4 J, 17; 179/100.2 Z, 100.2 T; 353/15–19, 120; 360/132

[56] References Cited

UNITED STATES PATENTS

| | | | |
|---|---|---|---|
| 3,177,768 | 4/1965 | Hallamore | 274/4 C |
| 3,218,080 | 11/1965 | Best | 274/17 |
| 3,238,842 | 3/1966 | Wiklund et al. | 274/4 J |
| 3,243,189 | 3/1966 | Proctor | 274/17 |
| 3,265,457 | 8/1966 | Dale | 352/72 |
| 3,296,925 | 1/1967 | Yamamoto | 274/4 J |
| 3,578,334 | 5/1971 | Ban | 179/100.2 Z |

*Primary Examiner*—Harry N. Haroian
*Attorney, Agent, or Firm*—Waters, Schwartz & Nissen

[57] ABSTRACT

A cassette for a band-shaped magnetic recording support, characterised in that it comprises an elongate core and two half-covers forming a casing and assembled so as automatically to leave sufficient space for the band to be suitably driven and guided, so that the core acts as a drive shoe, and the casing is formed with windows or openings which have a minimum area and allow access to those parts of the band which are necessary for driving it and playing the recordings and reading the markers (FIG. 7).

18 Claims, 22 Drawing Figures

CASSETTE FOR A BAND-SHAPED MAGNETIC RECORDING SUPPORT

This application is a continuation application of Ser. No. 36,065; filed May 11, 1970.

The invention relates to a cassette for a band-shaped magnetic recording support.

In essentials, the main aim of the invention is to provide a cassette having a relatively small recording capacity but having a small volume which is easy to manipulate and of simple design and therefore cheap. The invention also aims to provide shapes which can easily be stacked so as to facilitate storage and selection in automatic playback devices. Another aim is to ensure that the band is efficiently protected, since it is accessible only through windows or openings which are reduced to the bare minimum required for playing and driving the tape.

Another aim is to ensure that the cassette can easily be identified by markers which may form part of a code and can be set up by the user in order visually to locate a cassette and to select a particular cassette from a stack.

Another aim of the invention is to prevent the cassette from being incorrectly manipulated when it is inserted into the operative position. Finally, the cassette according to the invention has a list of recordings so that the user can know which recording or which part of a recording is being played and can easily move the playback head to the position for playing a particular recording.

According to the main feature of the invention, the cassette comprises an elongate core and two half-covers forming a casing and assembled so as automatically to leave sufficient space for the band to be suitably driven and guided, so that the core acts as a drive shoe and the casing is formed with windows or openings which have a minimum area and allow access to those parts of the band which are necessary for driving it and playing the recordings and reading the markers.

The nature and importance of other features of the invention will be clear from the following drawings of nonlimitative examples and from the following description. In the drawings.

As the drawings show, a cassette according to the invention essentially comprises two half-covers 1–2 containing an elongate core 3 (FIGS. 1–3) round which an endless support is wound, comprising a band 4 bearing magnetic recordings. The core 3 serves as a guide and drive shoe for the band 4.

Figures 1, 2, 3, 4, 5, 6:
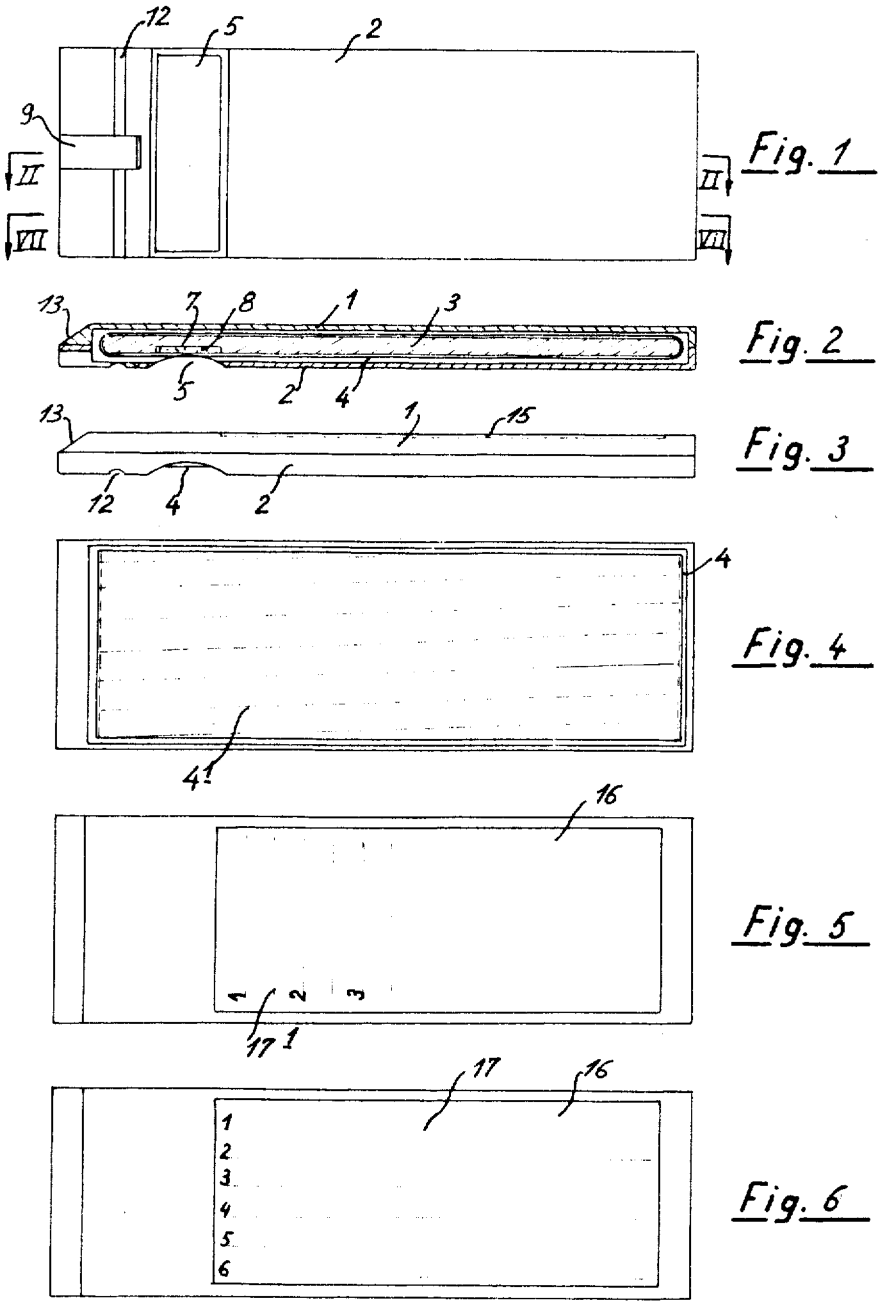
FIG. 1 is a plan view, normally the bottom, of the cassette.
FIG. 2 is a cross-section along line II–II of FIG. 1.
FIG. 3 is a side elevation of the cassette in its normal operating position.
FIG. 4 shows the inside of the cassette.
FIGS. 5 and 6 show a labelled index placed on the cassettes.

The recordings are usually in the form of a spiral, as shown at $4^1$ in FIG. 4 and disclosed e.g. in a patent application filed simultaneously with the present application.

The two half-covers 1–2 are assembled to form a closed container leaving sufficient room for the band 4 to be suitably driven and guided.

One surface of the casing has a window 5 which extends along the whole length of the cassette and in which the playback head 6 (FIG. 18) moves and through which the playback head can touch the band 4 in order to play the recordings.

The core 3 can have a groove 7 forming a recess for a pad 8 of felt or other material for facilitating contact between the recording head and the magnetic band.

Another window 9 is formed along the transverse edge near the window 5, generally in the lower half-casing 2, and extends a short distance along the longitudinal axis of the cassette and receives the roller 10 driving the magnetic band. The spindle 11 of roller 10 rotates in a recess 12 in the half-casing.

Figure 7:
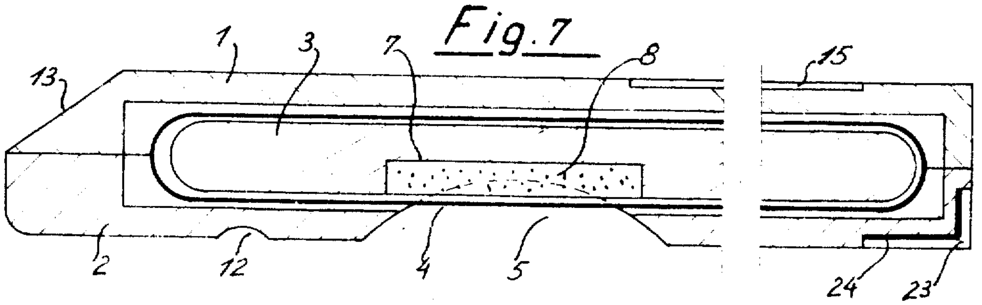
FIG. 7 is an enlarged sectional view along the line VII–VII in FIG. 1.
Figure 8:
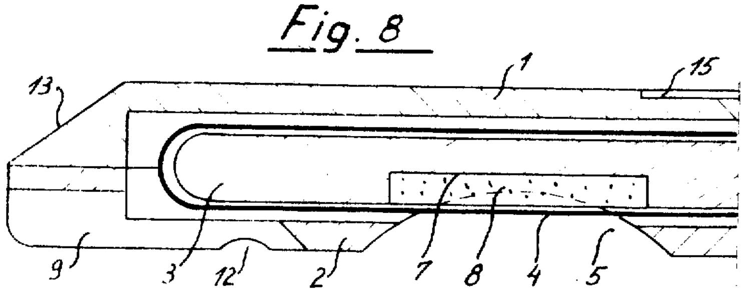
FIG. 8 is an enlarged view of part of FIG. 2.
Figure 16:
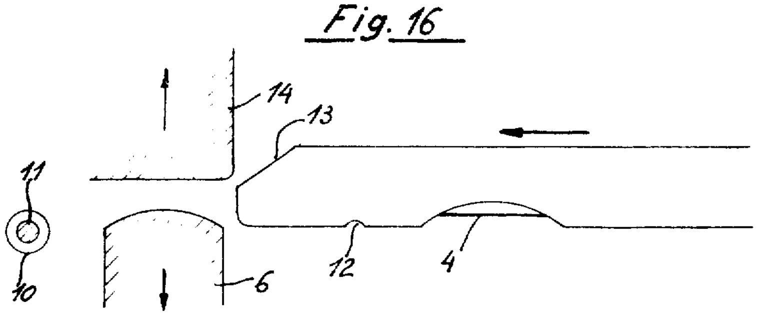
FIGS. 16 to 18 show different stages of the process of inserting a cassette into a playback device.
Figure 17:
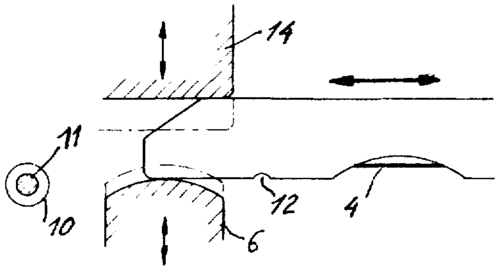
Figure 18:
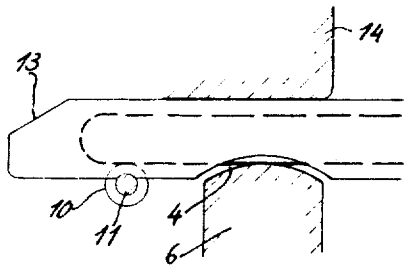

According to a feature of the invention, at one corner of the cassette on the side which engages in the playback device the casing has a bevel or rounded portion (FIGS. 7 and 8) which facilitates insertion between the playback head 6 and a movable part 14 of the playback device and also prevents any faulty manipulation, in that the user has to insert the cassette so that its surface formed with window 5 is on the same side as the playback head (FIGS. 16–18).

Figure 19:
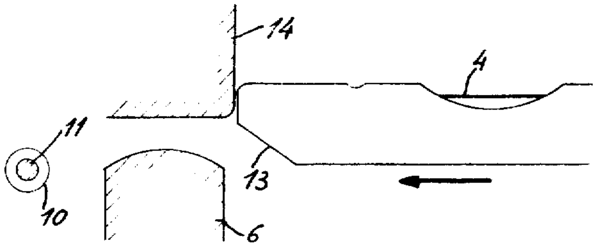
FIG. 19 shows what happens if a cassette is incorrectly manipulated when inserted into a playback device.

FIG. 19 shows that the cassette cannot be inserted if its surface formed with window 5 is turned away from the playback head or if the other end of the cassette is inserted first.

Clearly, the cassette can be moved to the operative position in only one way, and the geometry of the device is such that the cassette can be inserted only in a manner determined by the bevel or rounded portion since any other method of insertion is prevented and distinguished by the three other corners, which are not beveled or rounded.

The major surface of the half-casing 1 can be formed with a hollow 15 (FIG. 7) for receiving a label bearing symbols showing the recordings borne by the band (FIGS. 5 and 6). The symbols can be disposed so that the position of the playback head is directly related to the position of the symbols (the titles of the recordings).

Figure 20:
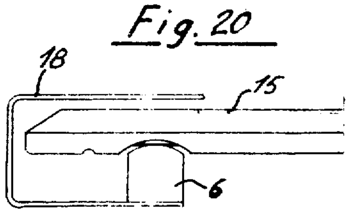
FIGS. 20 to 22 show means for indicating what recording is being played and for relating the playback head to the labelled index.
Figure 22:
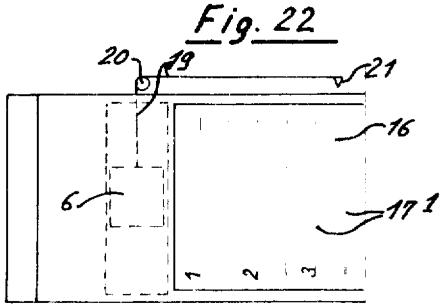
Figure 21:
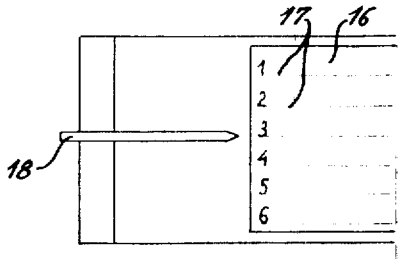
Figure 23:
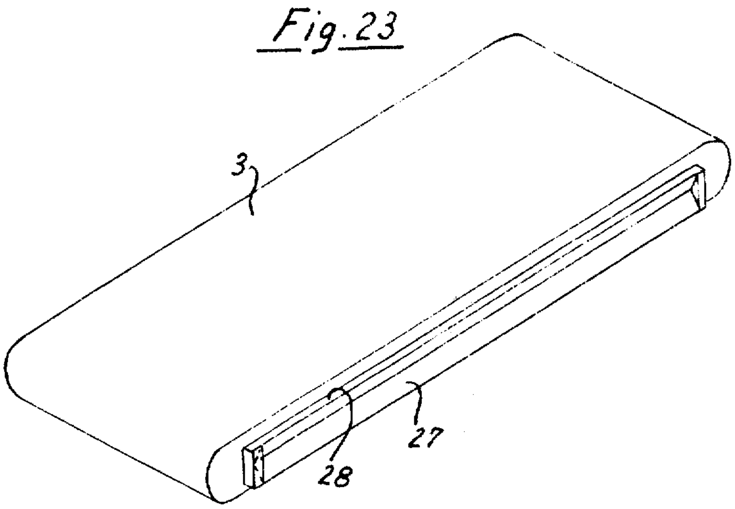
FIGS. 23 to 28 show means for easily and rapidly fitting two half-casings together.
Figure 24:
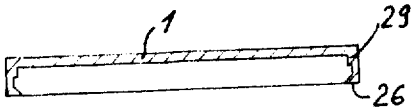
Figure 25:
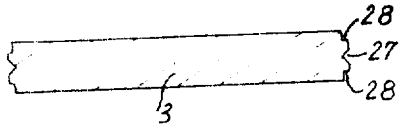
Figure 26:
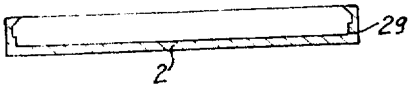
Figure 27:
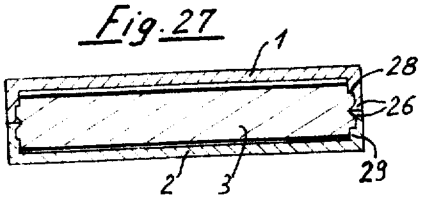
Figure 28:
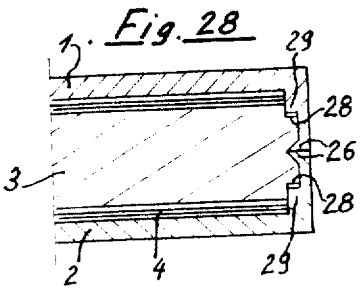

Lines 17 holding the symbols can be parallel to the longitudinal axis of the cassette (FIG. 6) and a pointer 18 (FIGS. 20 and 21) can be connected to and move with the playback head and shaped and disposed so as to slide along the lines In FIG. 5, the lines $17^1$ on the label are disposed transversely. In the last-mentioned embodiment, the head 6 (FIG. 22) is attached to a line 19 guided by a roller 20 and ending in a pointer 21 which moves along a major lateral surface of the cassette and consequently along the lines of symbols so as to indicate a recording.

In the afore-mentioned embodiments, the playback head can directly indicate its position in relation to the recording, and can thus not merely indicate the recording which is being played but can also rapidly move to a position for playing the recording which it is desired to play next.

Figure 15:
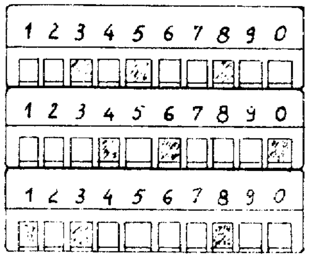
FIG. 15 shows a number of cassettes stacked on top of one another so that a particular cassette can be located by a selector.

As FIG. 15 shows, the cassettes can easily be stacked. When they are piled up, it is clearly desirable that the user can easily trace a particular cassette bearing one or more recordings which he wishes to play.

Accordingly, each cassette can be identified by a number which forms part of a code and which can be identified.

Figure 9:
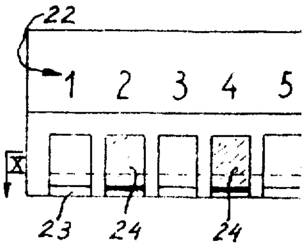
FIG. 9 to 14 are details showing how each cassette is identified.
Figure 11:
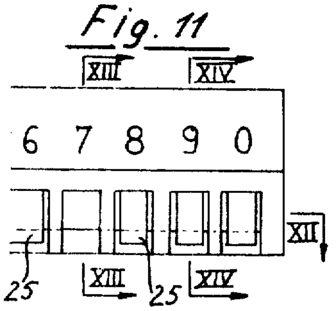
Figure 13:
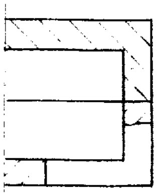
Figure 14:
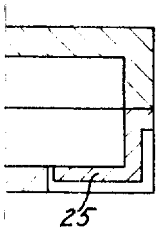

To this end, the cassette can bear a row of digits 1 to 0 (reference 22, FIGS. 9 and 11) and a marking element disposed opposite each digit can be used to form a number for identifying the cassette.

Figure 10:
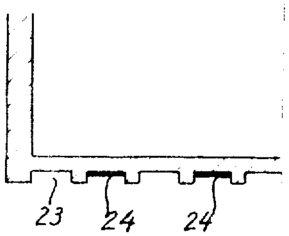
Figure 12:
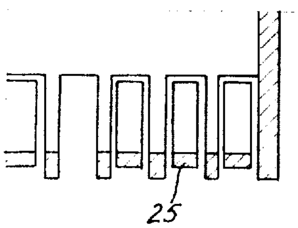

For example, a hollow 23 (FIGS. 9 and 10) formed below each digit can extend a short distance along the bottom surface. Each hollow, in the manner disclosed in Franch Patent application No. 26.953 filed by the applicant on 4 April 1966, can receive a plate or marker 24 made of reflecting material which can be in the form of an angle member (FIG. 7) designed to receive light rays from a lamp which the plate reflects to a photocell.

The code numbers can easily be formed by providing each cassette with plates at positions corresponding to the digits of the number. Cassette number 246, for example, has plates in the hollows 23 formed underneath the digits 2, 4 and 6.

Since the reflecting plates 24 are angle members, the cassettes can be identified either by rays striking their side (which is advantageous when they are stacked as in FIG. 15) or by rays striking the bottom (which is useful for checking whether they are in the playback device).

FIGS. 11–14 show a variant in which the digits used in the code numbers are formed by breaking, i.e. removing material 25 from positions corresponding to the positions of the reflecting plates, thus leaving hollows which can be visually read.

FIG. 15 shows a number of cassettes stacked on one another and coded (358, 460 and 138) so that a cassette can by located by a selector.

As FIGS. 23–28 show, each cover 1–2 can have a bending 26 extending along the edge of almost the entire length of its lateral surfaces. The apex of the bending 26 extends inwardly and engages in a groove 27 which is formed in core 2 and comes in contact with corresponding bending 26 in the other half-casing. The core 2 can also have a cutaway portion at the top and bottom along its lateral surfaces, giving a bearing surface 28 receiving a corresponding internal projection 29 of the half-casing 1 or 2.

Consequently, the half-casings can engage or interlock with one another, merely be being pressed, so as to ensure that sufficient space is left for the band to move and be guided.

What I claim is:

1. A cassette for an endless band-shaped magnetic recording tape adapted for insertion into a playback device having a playback head for contacting the tape, a part movable relative to said playback head, said cassette being insertable between said playback head and said movable part, and driving means for moving the tape relative to the playback head; comprising an elongated core having at least two parallel surface portions; a housing including complementary upper and lower cover portions encasing said core, said housing having internal dimensions providing for clearance about the parallel surface and end portions of said core; said recording tape being wound around the said core extending about the parallel surface and end portions of said core and being longitudinally slidable relative thereto; a first aperture in one of said cover portions extending across the width of said housing providing ingress to said playback head to contact said tape for playing the recordings on the tape; a second aperture in said last-mentioned cover portion extending from the leading transverse edge portion insertable into the playback device longitudinally a short distance along said cover portion for ingress of said driving means into said housing for engaging and moving said tape relative to the playback head, and said housing having along the leading edge of the cassette which engages in the playback device a beveled configuration facilitating insertion between said playback head and said movable part of the playback device in a manner facilitating insertion of said cassette into said playback device in a mode whereby its surface having the first aperture is on the same side as the playback head and preventing insertion of the cassette in any other orientation.

2. A cassette as claimed in claim 1, comprising a bevel formed along one edge of the housing on the side where the cassette engages in the playback device to facilitate insertion between the playback head and said movable part of the playback device.

3. A cassette as claimed in claim 1, comprising a rounded portion formed along one edge of the housing on the side where the cassette engages in the playback device to facilitate insertion between the playback head and said movable part of the playback device.

4. A cassette as claimed in claim 1, including a recess formed in the surface portion of said core facing said first aperture, said recess extending across the width of said core and being coextensive with said first aperture; and an essentially resilient member being positioned in said recess, said resilient member having a surface generally coplanar with the surface of said core and adapted to facilitate resilient contact under tension between the surface of the tape and the playback head upon insertion of the cassette into the playback device.

5. A cassette as claimed in claim 4, wherein said resilient member is constituted essentially of a felt-like material.

6. A cassette as claimed in claim 1, comprising indicia on said housing indicative of the recording on said magnetic tape.

7. A cassette as claimed in claim 6, comprising means associated with said indicia for correlating the position of the playback head relative to the recording on said magnetic tape.

8. A cassette as claimed in claim 7, wherein said indicia extend longitudinally of said housing.

9. A cassette as claimed in claim 8, comprising lines holding indicia extending parallel to the longitudinal axis of the cassette, and said correlating means comprising a movable pointer in said playback device, said pointer being movable concurrently with motion of the playback head across the magnetic tape.

10. A cassette as claimed in claim 6, wherein said indicia extend transversely across said housing.

11. A cassette according to claim 10, said playback head being attached to a line guided by a roller and ending in a pointer which moves along a major lateral surface of the cassette, and consequently along the transversely extending indicia so as to indicate a recording.

12. A cassette as claimed in claim 1, comprising means on said housing for identifying said cassette when a plurality of said cassettes are stacked.

13. A cassette as claimed in claim 12, said identifying means comprising a plurality of recessed portions in said housing and digit bearing marker elements being positioned in at least some of said recessed portions for identifying the cassette.

14. A cassette according to claim 12, wherein the cassette bears a row of digits and a marking element disposed opposite each digit is used to form a number for identifying the cassette.

15. A cassette according to claim 14, wherein a hollow is formed below each digit and extends a short distance along the bottom surface; a plate made of reflecting material being received in each hollow.

16. A cassette according to claim 15, wherein said reflecting material plate comprises an angle member adapted to receive light rays from a lightsource which the plate reflects to a photocell.

17. A cassette as claimed in claim 1, said housing comprising two covers forming half-casings, each said cover having a beading extending along the edge of almost the entire length of its lateral surfaces, the apex of each beading projecting inwardly and engaging in a groove which is formed in the core and contacting a corresponding beading in the other half-casing.

18. A cassette as claimed in claim 17, said core having a cut away portion at the top and bottom along its lateral surfaces so as to form a bearing surface for receiving a corresponding internal projection of one half-casing.

* * * * *